3,663,632
METHOD OF RECOVERING UNREACTED MONOMERS
Kenji Takeya and Mitsutoshi Okazaki, Okayama, and Toshiyuki Kobashi, Tsukubo-gun, Japan, assignors to American Cyanamid Company, Stamford, Conn.
Filed May 13, 1970, Ser. No. 36,956
Int. Cl. C07c 21/08, 121/32; C07k 21/06
U.S. Cl. 260—654 S    8 Claims

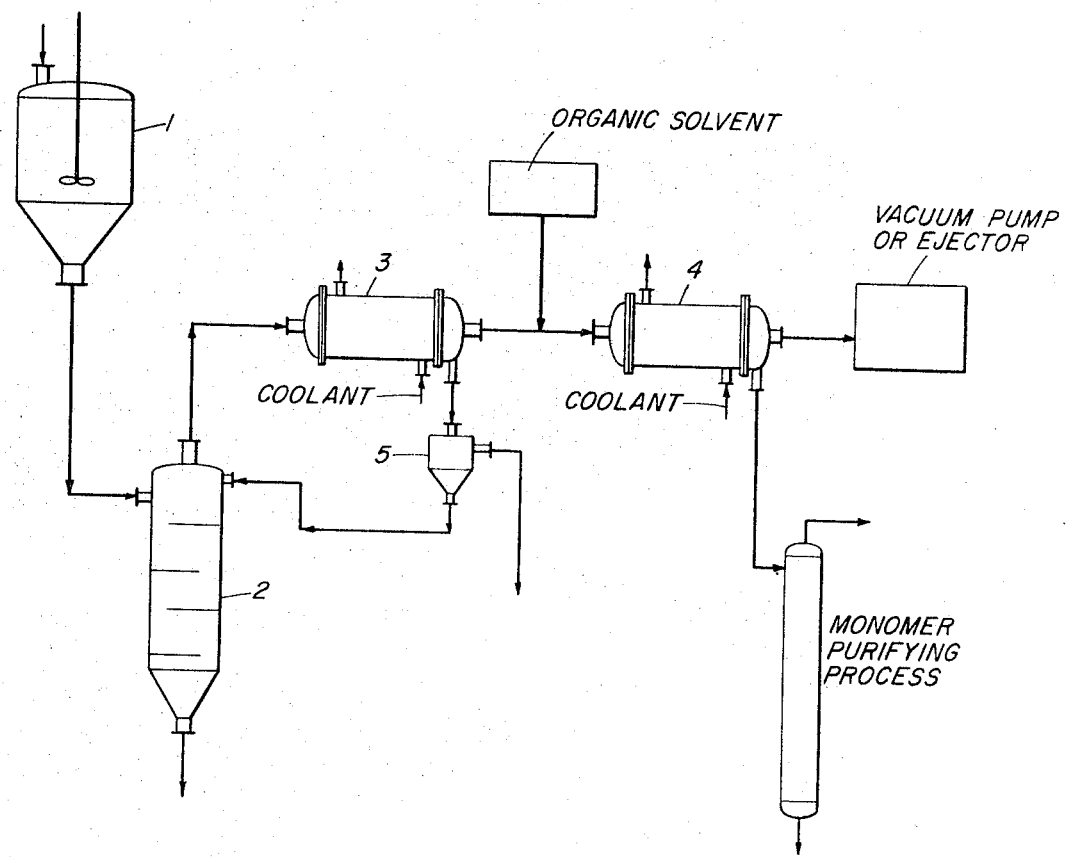

ABSTRACT OF THE DISCLOSURE

A process for recovering unreacted monomers from a polymerization reaction mixture comprising acrylonitrile and a water-immiscible monomer of lower boiling point than acrylonitrile is disclosed which process comprises distilling said monomers from the reaction mixture under vacuum, recovering acrylonitrile and a portion of said water-immiscible monomer in a first condensation step, condensing additional monomer while simultaneously introducing into said vapors an organic liquid at a temperature above its melting point, said organic liquid having a melting point below the temperature of condensation and dissolving water at the temperature of condensation, so as to form a second condensate comprising water-immiscible monomer, water and said organic liquid, and recovering low boiling monomer from said second condensate.

---

This invention relates to a process for recovering unreacted monomer from an aqueous polymerization reaction mixture. More particularly, this invention relates to a process for recovering acrylonitrile and a water-immiscible copolymerizable monomer having a boiling point below that of acrylonitrile from a polymerization reaction mixture containing water, polymer, unreacted acrylonitrile and unreacted low-boiling water-immiscible monomer.

In commercial processes of polymerization, whether of batch or continuous type, some unreacted monomer generally remains in the polymerization reaction mixture. In some instances, it may be desirable to obtain a polymer at low monomer conversion in order to obtain a polymer at low monomer conversion in order to minimize discoloration and molecular weight variation in the formed polymer and in such instances it is economically important to recover unreacted monomer. Various processes have been proposed for recovering unreacted monomer from polymerization reaction mixtures. The usual procedure involves distillation under reduced pressure so as to minimize discoloration and denaturation of the formed polymer. The distillate which contains monomer is then condensed and the monomer recovered. Monomer recovered in this manner can be employed in the monomer feed in subsequent polymerization reactions.

Acrylonitrile is a preferred monomer in numerous polymerization reactions and is generally polymerized in an aqueous medium, i.e. by emulsion or dispersion technique. For many purposes, the polymers of acrylonitrile obtained by such technique are those which contain a major portion of acrylonitrile and a minor portion of one or more monomers copolymerizable with acrylonitrile. In recovering unreacted monomer from aqueous polymerization reaction mixtures containing acrylonitrile and another monomer, problems can arise due to the fact that water is co-distilled with the reacted monomers. In condensing the distillate therefore, care must be exercised to avoid use of coolants in the condenser jacket at temperatures which lead to freezing of the water formed as a co-condensate so as to avoid plugging of the condenser. In those instances where all monomers have a boiling point which is at least equal to or higher than that of acrylonitrile, no special problems in the recovery of reacted monomers is occasioned since condenser coolant temperatures normally employed to recover acrylonitrile are also effective for unreacted monomers of boiling points equal to or greater than that of acrylonitrile. A particular problem results, however, when monomers used in conjunction with acrylonitrile have boiling points lower than that of acrylonitrile, particularly when such monomers are also water-immiscible.

The problem associated with recovery of unreacted monomers from an aqueous polymerization reaction mixture based on acrylonitrile and a water-immiscible monomer of lower boiling point than acrylonitrile stems from the fact that the temperature of condenser coolant is limited to avoid freezing of water in the condensate and plugging of the condenser. The lower temperature limit of the coolant is not sufficiently low to provide complete condensation of low-boiling water-immiscible monomer in the distillate, with the result that uncondensed low-boiling water-immiscible monomer escapes through the discharge of the vacuum-creating device and is lost. When the low-boiling monomer is water-miscible, improved recovery of such monomer is occasioned by mixing or dissolving of such monomer distillate in condensed water, but, of course, such mixing or dissolving is not possible with a low-boiling water-immiscible monomer distillate and recovery is effective only to the extent realized by coolant efficiency at the lower temperature limit thereof.

In copending application Ser. No. 31,482 filed Apr. 24, 1970 and assigned to a common assignee, there is disclosed a process for recovering unreacted monomers from a polymerization reaction mixture comprising acrylonitrile and a water-immiscible monomer of lower boiling point than acrylonitrile which process comprises distilling said monomers from the reaction mixture under vacuum, recovering acrylonitrile and a portion of said water-immiscible in a first condensation step under vacuum, recovering additional water-immiscible monomer by a second condensation at normal pressure in water at a ratio of monomer to water too low for stratification and decantation distilling low-boiling monomer from said second condensate, and recovering said low-boiling monomer as a third condensate at a ratio of monomer to water suitable for stratification and decantation. Although this process is effective in monomer recovery, it is limited to vacuum-creating devices which employ water as the operating fluid. Since the freezing point of water is 0° C. and the process of the copending application operates with water in fluid form at normal pressure, the process is limited to recovery of monomers having boiling points above 0° C. and generally above 10° C. as a practical matter.

Accordingly, there is needed a process for recovering unreacted monomers from an aqueous polymerization reaction mixture formed by copolymerization of acrylonitrile with another monomer, said other monomer being water-immiscible and having a boiling point lower than that of acrylonitrile, said process avoiding the limitations as to specfic equipment required and to lower limit of boiling point of monomer.

In accordance with the present invention there is provided a process for recovering unreacted monomer from an aqueous polymerization mixture resulting from copolymerization of acrylonitrile and a water-immiscible monomer having a boiling point in the range of −40° C. to 70° C., at standard conditions, said mixture comprising water, polymer acrylonitrile and said water-immiscible monomer, which process comprises the steps of: (1) heating said polymerization mixture under vacuum to vaporize water, acrylonitrile and said water-immiscible monomer so as to produce a polymerization mixture substantially free of unreacted monomer; (2) partially condensing vapors from step (1) so as to form a first condensate comprising water, substantially all of the acrylonitrile in said vapors, and, at most, a portion of said water immiscible monomer in said vapors; (3) stratifying and decanting the monomer from said first condensate and recycling the residue to step (1); (4) condensing the remaining vapors while simultaneously introducing into said vapors an organic liquid at a temperature above its melting point, said organic liquid having a melting point below the temperature of condensation and dissolving water at the temperature of condensation, so as to form a second condensate comprising said water-immiscible monomer, water, and said organic liquid; and (5) recovering low-boiling monomer from said second condensate.

The process of the present invention enables recovery of water-immiscible law-boiling monomer in amounts in excess of 95% of that amount present as unreacted monomer in the polymerization reaction mixture as well as essentially complete recovery of acrylonitrile and other monomers conventionally employed therewith and thus provides considerable economic advantages in such polymerization reactions. The process of recovery enables the recovered monomers to be employed directly in subsequent polymerization reactions. The process is especially advantageous where low monomer conversion are achieved. The process also minimizes losses of monomer by discharge from vacuum devices and thus minimizes pollution problems. Further advances are provided by extending the types of vacuum-forming devices that are suitable in the process and by extending the range of low-boiling monomers recovered.

The process of preparation of the polymerization reaction mixture follows conventional procedures and the present invention is only concerned with removal of unreacted monomers from certain of the polymerization reaction mixtures. The polymerization reaction mixtures to which the process of the present invention is directed are those containing an aqueous medium, polymer, unreacted acrylonitrile and an unreacted water-immiscible monomer having a boiling point less than that of acrylonitrile. In preparing the initial mixture, monomers, water, polymerization initiators, and pH regulators are employed. The resulting mixture is then generally heated to initiate the polymerization which then continues as prescribed by the conditions employed. During the course of the polymerization various additions may be made, such as additional catalyst, additional monomer, additional pH regulators, additional water, and, if desired, molecular weight regulators. Eventually the polymerization reaction subsides and the desired polymer is present in the polymerization reaction mixture. In most instances due to equilibrium effects, the final polymerization reaction mixture contains unreacted monomers. The total amount of unreacted monomers will vary generally in any given instance and will depend on many factors including relative reactivity rates of individual monomers, temperature of polymerization reaction, amount and nature of initiator or catalyst employed, ratio of total monomer content to aqueous medium, presence or absence of molecular weight regulators or short-stopping agent, pH of the reaction mixture, and many others.

In preparing a polymerization reaction mixture containing acrylonitrile and low-boiling water-immiscible monomer it is possible to employ other monomer as well, if desired. Numerous literature is available to indicate the conventional monomers normally employed in copolymerizations with acrylonitrile. Many of the conventional monomers employed with acrylonitrile have boiling points that are equal to or higher than that of acrylonitrile or have sufficient water-miscibility to obviate monomer recovery problems. While the present process contemplates use of such monomers in conjunction with acrylonitrile, in such instances there must also be present a low-boiling water-immiscible monomer as well. Others of the conventional monomers employed are low-boiling water-immiscible monomers of the type to which the process of the present invention is directed. Still other monomers copolymerizable with acrylonitrile may not have reached the status of conventional monomers because of the very problem of recovery of unreacted monomer and the present process by providing for recovery of low-boiling water-immiscible unreacted monomers, enables economic use to be made of such monomers.

In considering recovery of a low-boiling water-immiscible monomer, two limits must be considered. Since acrylonitrile is used in conjunction with the low-boiling water-immiscible monomer and the boiling point of acrylonitrile is 77.3° C. at standard conditions, the low-boiling monomer must have a boiling point below that of acrylonitrile in addition to being water-immiscible. The second consideration relates to the lower limit of boiling point of the water-immiscible monomer. Since an organic liquid is added to vapors entering the second condensation step to aid in the condensation of low-boiling monomer, the boiling point of such monomer must be above that at which the organic liquid freezes. It can be readily appreciated that if the boiling point of the low-boiling monomer is very close to 77.3° C., the monomer can be recovered to a practical extent using conventional recovery processes. It can also be readily appreciated that if the boiling point of the low-boiling monomer is too close to the freezing point of the organic liquid added in the second condensation step, it will be difficult to recover the monomer to a practical extent by the process of the present invention. Accordingly, for practical purposes, the effective range of boiling points for water-immiscible monomers to be recovered by the process is from about —40° C. to 70° C., preferably in the range of —25° C. to 50° C.

Among the water-immiscible low-boiling monomers that can be recovered according to the process of the present invention are, for example vinylacetylene, allyl chloride, allyl fluoride, vinyl cyclopropane, vinyl bromide, vinyl chloride, 1-bromo-2,2-difluoroethylene, 1-bromo-2-fluoroethylene, 1 - bromo-1-fluoroethylene, 1-chloro-2-fluoroethylene, vinylidene chloride, vinyl trifluoroacetate, allylvinyl ether, divinyl ether, ethylisopropenyl ether, methylvinyl ether, ethylvinyl ether, propylvinyl ether, and isopropylvinyl ether.

The process of the present invention is effective over a wide range of contents of unreacted monomers in the polymerization reaction mixture. While from an economic viewpoint the amount of monomer to be recovered, the value of the recovered monomer, and the cost of the recovery process may be factors to be dealt with in considering a monomer recovery process, problems of pollution in the absence of monomer recovery process must also be considered. Thus, while the process of the present invention offers considerable economic advantages at a wide range of unreacted monomer contents, the process also avoids pollution problems at levels of unreacted monomer that are below that offering economic advantage.

The process of the present invention is carried out under reduced pressure, preferably below about 300 millimeters of mercury, absolute, and at a temperature of less than about 75° C. in distilling monomers from the polymerization reaction mixture. As the means for providing reduced pressure there may be employed any conventional vacuum-forming device such as a vacuum pump, a steam ejector, a water jet pump, and similar devices. Operation at reduced pressure avoids discoloration of the polymer, which occurs on prolonged heating at a temperature in excess of about 75° C.

The vapors emanating from the polymerization reaction mixture include water, acrylonitrile, and low-boiling monomer. Part of the vapors in the distillate are condensed in a first condensation step employing coolant at a temperature sufficient to effect partial condensation but not so low as to cause freezing of water in the condensate.

It is generally preferable to use a temperature in the range of about −1° C. to 25° C. for the coolant in the first condensation step. Generally, essentially all of the acrylonitrile present in the distillate is recovered in the first condensation step along with some of the water in the vapors. Whether or not any low-boiling monomer is recovered in the first condensation steps depends upon the boiling point of the low-boiling monomer and the temperature of the coolant. The condensate from the first condensation step is subjected to stratification and decantation for monomer recovery with the residue being recycled to the polymerization reaction mixture.

The vapors which pass through the first condensation step are fed to a second condensation step while an organic liquid is simultaneously fed as an aid in condensing the low-boiling monomer. The organic liquid is a solvent for water and prevents freezing of water in the condensate at the low coolant temperature employed in the second condensation step. The temperature of the coolant employed in the second condensation will vary somewhat depending upon the boiling point of the low-boiling monomer and the freezing point of the organic liquid. Generally, however the coolant will be in the range of from about 1° C. to about −50° C.

The organic liquid is added as a liquid or vapor into the vapor emanating from the first condensation step as the vapor is fed into the second condensation step. The organic liquid must have the ability to dissolve water at the temperature employed in the second condensation step. If the liquid does not dissolve water in all proportions at the temperature of use, there must be employed sufficient of the liquid to dissolve all of the water present in the vapors containing the low-boiling monomer. Suitable organic liquids include, for example, methanol, ethanol, 1-propanol, 2-propanol, 1-butanol, 2-butanol, 2-methyl-2-butanol, 4-methyl-2-pentanol, acetaldehyde, propionaldehyde, acetone, 2-butanone, ethyl acetate, diethyl maleate, and acrylonitrile.

If the organic liquid has only a limited solubility for water, the amount of such liquid added to the vapors containing low-boiling monomer should be at least that amount capable of dissolving all of the water in the vapor at the coolant temperature employed and the coolant temperature should be above the freezing point of the solution of water in organic liquid thus formed. Where the organic liquid dissolves water in all proportions, it is only necessary to employ a coolant temperature above the freezing point of water in the organic liquid.

After the low-boiling monomer has been condensed in the second condensation step, the condensate obtained will contain low-boiling monomer, water, and organic liquid, and possibly small amounts of other monomers present in the polymerization reaction mixture and not completely recovered in the first condensation step. The second condensate is then suitably treated to recover low-boiling monomer and other components therein. Such treatment may be one of extraction, evaporation and condensation, fractionation, and similar conventional procedures for refining such compositions.

The invention is further illustrated in an embodiment shown in the accompanying figure, which is a flow diagram of the process and includes equipment useful in carrying out the process. In the drawing, the reaction vessel 1 is that used in carrying out the polymerization reaction. The polymerization reaction mixture flows from the reactor 1 into a diffusion tower 2, sometimes referred to as a steam stripper, so that unreacted monomers in the reaction mixture are vaporized. Vapors from the diffusion tower are fed to a first condenser 3, which contains coolant at a temperature sufficiently low to condense acrylonitrile but not so low as to freeze water in the condensate. The condensate of condenser 3 flows into decanter 5 where it is stratified enabling recovered monomers to decant from the side port while residue is recycled to the diffusion tower. Vapors not condenser 3 are next fed into condenser 4 maintained at a temperature sufficient to condense low-boiling monomer and not to freeze the condensate. As the vapors are fed to condenser 4 they are joined by the organic liquid so that the liquid will aid in condensation and prevent freezing of water in the condensate. Condenser 4 is connected to a vacuum-creating device in a manner which maintains both condensers and the diffusion tower at reduced pressure. The condensate of condenser 4 flows into the monomer purifying process which may, for example, be a fractionation column capable of separating and recovering the low-boiling monomer, organic liquid, and water.

The process of the present invention is further illustrated by the examples which follow, wherein the percentages are by weight.

EXAMPLE 1

A continuous polymerization vessel equipped with agitation was employed at an operating temperature of 55° C. maintained by a heating jacket. Proper amounts of monomers consisting of 84% acrylonitrile, 7% methyl acrylate, and 9% vinylidene chloride were added during the polymerization reaction along with water, nitric acid and a catalyst of sodium chlorate/sodium sulfite in a mol ratio of ⅓, respectively. The average residence time in the reactor was 70 minutes and the total monomer charge was such as to be 24% of the total composition. The pH was maintained at 2.3 with nitric acid and the amount of catalyst added was maintained at 0.6% of sodium chlorate on the weight of monomer added.

The effluent from the continuous reactor had the following composition:

|   | Percent |
|---|---|
| Polymer | 19.1 |
| Unreacted acrylonitrile | 4.04 |
| Unreacted methyl acrylate | 0.48 |
| Unreacted vinylidene chloride | 0.38 |
| Water | Balance |

The effluent polymerization reaction mixture, in the form of a slurry, was continuously fed into the recovering apparatus illustrated in the drawing. A distillation tower 2 having four trays was heated to 52° C. by steam injected into the lower portion of the tower. The tower was maintained at an absolute pressure of 100 millimeters of mercury by means of a steam ejector appropriately positioned as shown. As a result more than 99% of unreacted monomers contained in the slurry were evaporated. The vapors were led into condenser 3 cooled with a coolant maintained at a temperature in the range of 0 to 2° C. The condensate recovered contained 99% of the acrylonitrile and methyl acrylate and 35% of the vinylidene chloride in the vapors. The condensate was stratified and monomer decanted and used in additional polymerization reactions. The residue from the decanter 5 was recycled to the diffusion tower 2. The uncondensed vapor emanating from condenser 3 was fed to condenser 4 operating with coolant at −30° C. Simultaneously with feeding of vapors into condenser 4, a spray of acrylonitrile was added with the vapors. The amount of acrylonitrile was such as to be 250 parts by weight for each part of water in the vapors. Condensate was continuously collected and fed into the monomer purifying process. In this manner 99% of the acrylonitrile and methyl acrylate and 97% of the vinylidene chloride present as unreacted monomers in the polymerization reaction mixture were recovered.

COMPARATIVE EXAMPLE

The procedure of Example 1 was followed in every essential detail except that no organic liquid was fed with vapors entering condenser 4. The condensate formed in condenser 4 froze and the operation could not be continued.

EXAMPLE 2

The procedure of Example 1 was repeated in every essential detail except that in place of the organic liquid added with vapors to condenser 4 there was added methanol. Similar results to those of Example 1 were obtained.

EXAMPLE 3

The procedure of Example 1 was repeated in every essential detail except that in place of the organic liquid added with vapors to condenser 4 there was added acetone. Similar results to those of Example 1 were obtained.

We claim:

1. A process for recovering unreacted monomers from an aqueous polymerization mixture resulting from copolymerization of acrylonitrile and another monomer, said other monomer having a boiling point in the range of —40° C. to 70° C. at standard conditions and being water-immiscible, said mixture comprising water, copolymer, acrylonitrile, and said other monomer, which process comprises the steps of:
   (1) distilling from said mixture under reduced pressure water, acrylonitrile, and said other monomer at a temperature less than about 75° C. so as to produce a mixture substantially free of unreacted monomers;
   (2) condensing vapors from step (1) so as to form a first condensate consisting essentially of water, acrylonitrile and said other monomer while leaving uncondensed vapors which pass through this step;
   (3) stratifying and decanting monomers from said first condensate and recycling the residue to step (1);
   (4) condensing the uncondensed vapors while simultaneously introducing into said vapors an organic liquid at a temperature above its melting point, said organic liquid having a boiling point below the temperature of condensation dissolving water at the temperature of condensation, and being employed in sufficient quantity to dissolve all of the water present in said uncondensed vapors, so as to form a second condensate consisting essentially of said other monomer water, and said organic liquid; and
   (5) recovering low-boiling monomer from said second condensate.

2. The process of claim 1 wherein said other monomer is vinylidene chloride.

3. The process of claim 1 wherein the organic liquid is acrylonitrile.

4. The process of claim 1 wherein the organic liquid is methanol.

5. The process of claim 1 wherein the organic liquid is acetone.

6. The process of claim 1 wherein said other monomer has a boiling point in the range of —25° C. to 50° C.

7. The process of claim 1 wherein the reduced pressure is below 300 millimeters of mercury, absolute.

8. The process of claim 1 wherein step (1) is conducted at a temperature of 52° C.

References Cited
UNITED STATES PATENTS 3,553,248    1/1971    Wakita et al. _____ 260—465.9

JOSEPH PAUL BRUST, Primary Examiner

U.S. Cl. X.R.

260—465.9, 486 R, 487, 616, 653.3, 656 R, 666 A, 678